United States Patent [19]

Allen et al.

[11] Patent Number: 4,735,701

[45] Date of Patent: * Apr. 5, 1988

[54] DISK CARRIER

[75] Inventors: Ronald Allen, San Jose; Tu Chen, Saratoga, both of Calif.

[73] Assignee: Komag, Inc., Milpitas, Calif.

[*] Notice: The portion of the term of this patent subsequent to Jun. 17, 2003 has been disclaimed.

[21] Appl. No.: 855,019

[22] Filed: Apr. 22, 1986

Related U.S. Application Data

[63] Continuation-in-part of Ser. No. 642,853, Aug. 21, 1984, Pat. No. 4,595,481.

[51] Int. Cl.⁴ .............................................. C23C 14/00
[52] U.S. Cl. .................................. 204/298; 204/192.1; 204/192.2; 118/500; 118/504; 118/505; 292/347
[58] Field of Search .............. 204/192 R, 298, 297 W, 204/297 R, 192.1, 192.12, 192.2; 118/500, 501, 502, 503, 504, 505; 156/345, 643; 292/251.5, 347, 348, 358; 220/230

[56] References Cited

U.S. PATENT DOCUMENTS

| | | | |
|---|---|---|---|
| 4,049,523 | 9/1977 | Boehnke et al. | 204/298 |
| 4,141,811 | 2/1979 | Yerkes et al. | 156/643 |
| 4,222,839 | 9/1980 | Goodner et al. | 204/192 E |
| 4,336,438 | 6/1982 | Vehara et al. | 204/192 E |
| 4,424,096 | 1/1984 | Kumagai | 204/192 E |
| 4,473,455 | 9/1984 | Dean et al. | 204/298 |
| 4,500,407 | 2/1985 | Boys et al. | 204/298 |
| 4,584,045 | 9/1986 | Richards | 204/298 |
| 4,589,639 | 5/1986 | Mahler | 118/500 |

Primary Examiner—John F. Niebling
Assistant Examiner—Nam X. Nguyen
Attorney, Agent, or Firm—Thomas S. MacDonald; Alan H. MacPherson; Paul J. Winters

[57] ABSTRACT

A carrier is provided to hold a centrally apertured disk while magnetic material is coated simultaneously on the two surfaces of the disk. A carrier includes a plate which contains a first opening through the plate slightly smaller than the disk diameter and a second opening partially through the plate formed about a center line offset from the center line of the first opening to form a recess around an upper portion of first opening edge. The disk is directed into the recess and first opening and then lowered into a groove at the bottom of the first opening. The groove and recess in conjunction with the disk edges block flow of plasma and impurities from one side of the disk to the other during simultaneous coating of magnetic media on the disk surfaces. A two-part plug is placed in the disk center aperture, one part containing a spring or magnet for holding the two parts together in the disk. The plug also serves as a handle by which the disk can be carried, mounted in or removed from the carrier. A plurality of carrier openings allow all surfaces of a corresponding plurality of disks mounted therein to be coated simultaneously with magnetic media. Some of the second openings may be provided on one side and the remainder of the second openings on the other side of the carrier to provide for simultaneous loading and unloading of disks from both sides of the carrier.

12 Claims, 6 Drawing Sheets

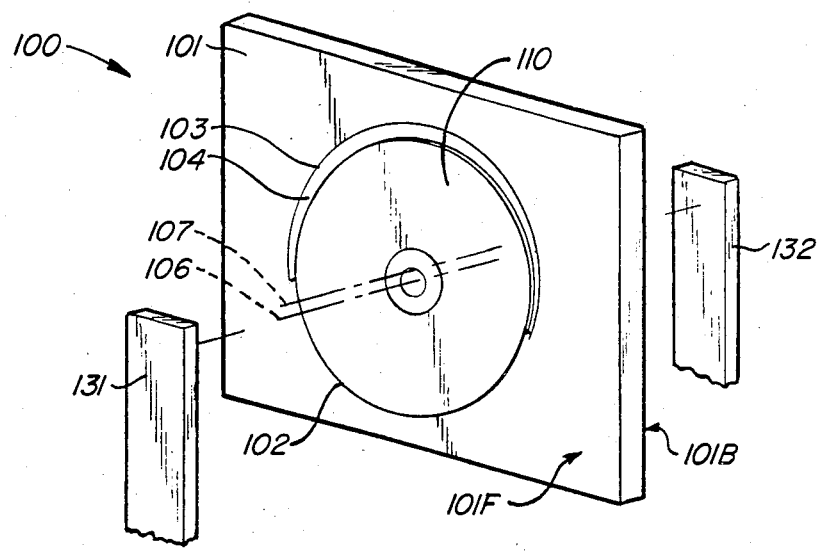
FIG._1.
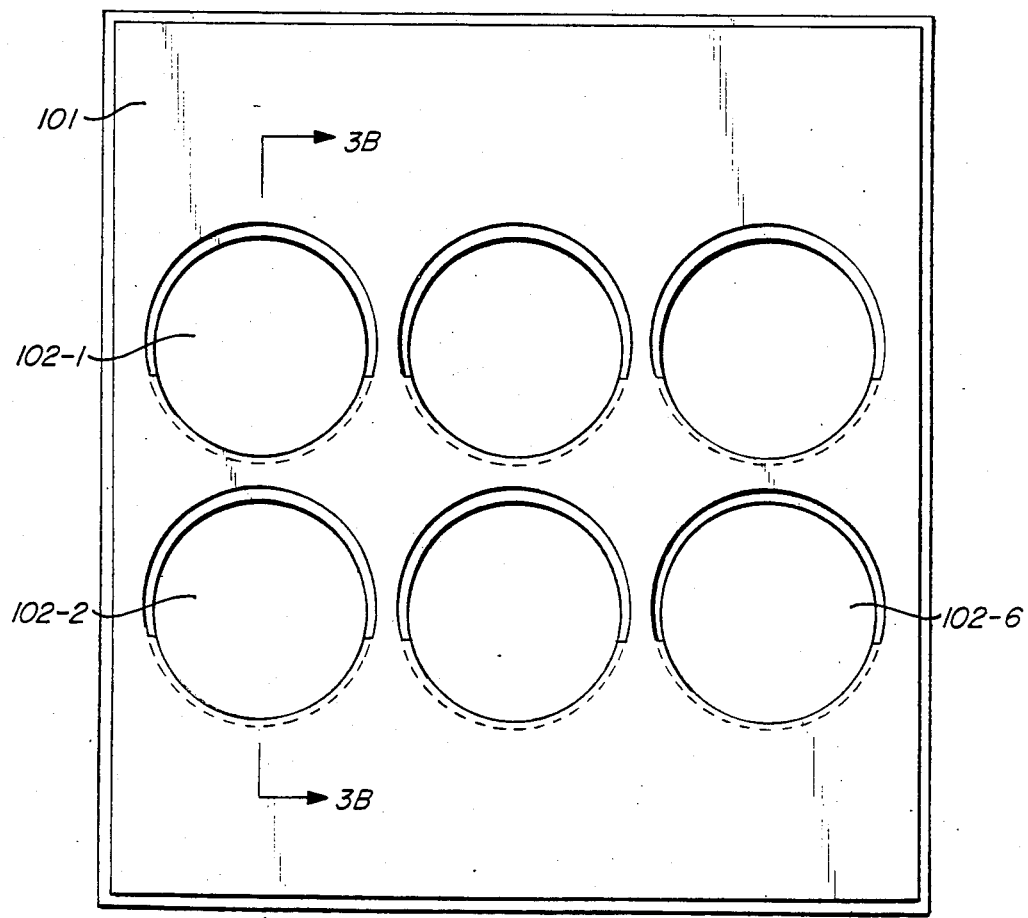
FIG._4.

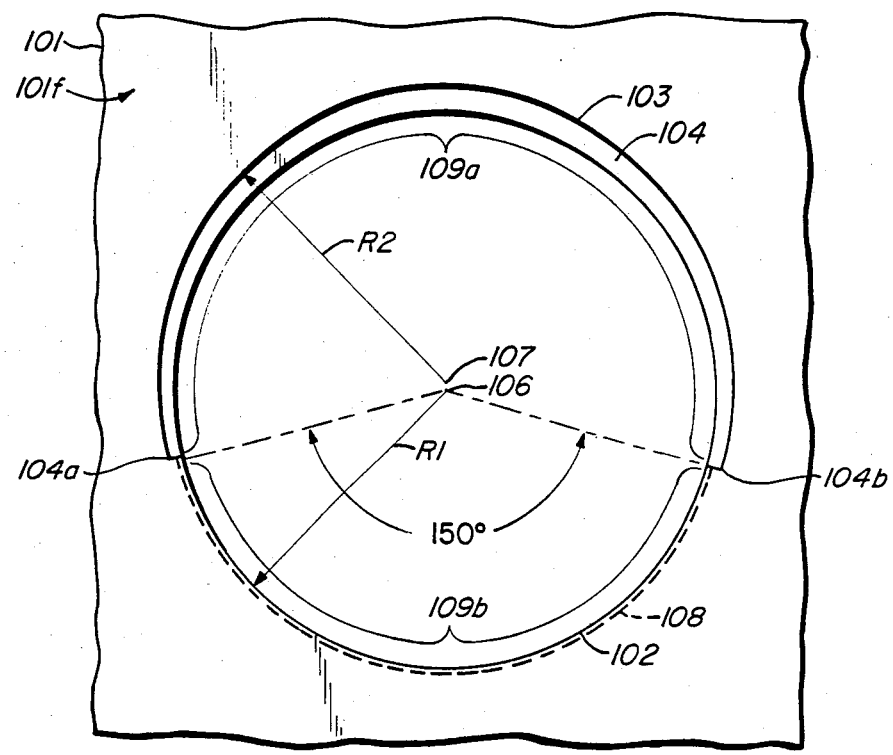
FIG._2a.
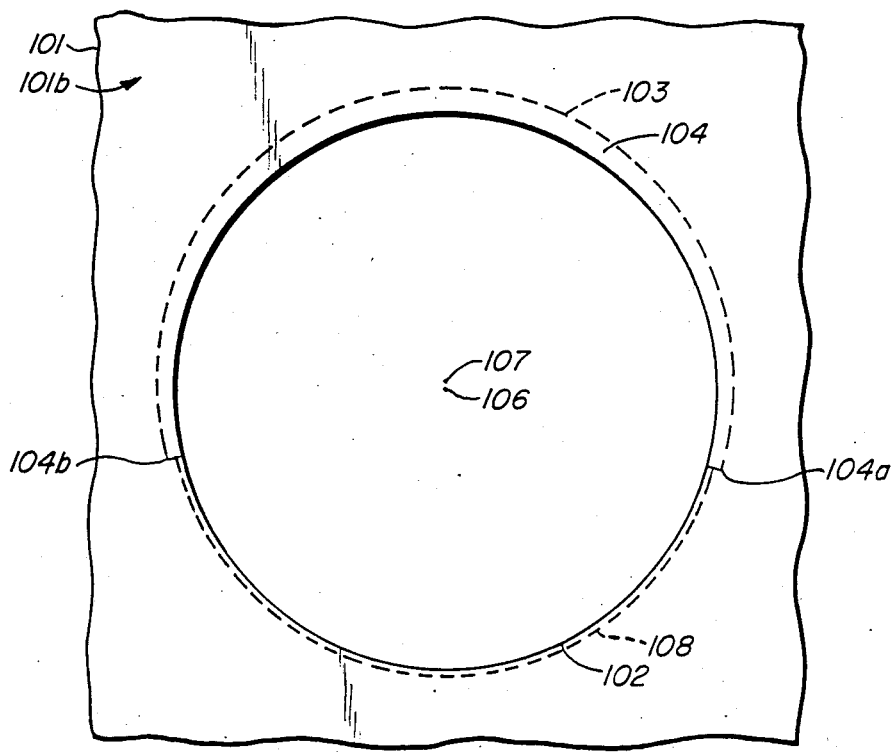
FIG._2b.

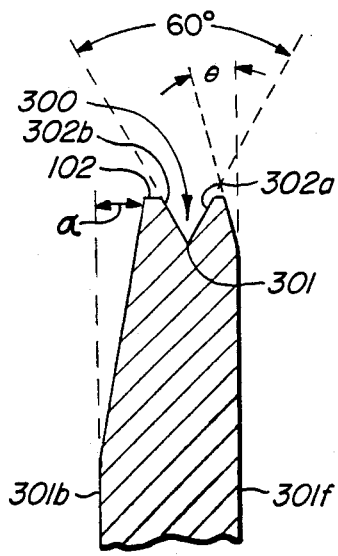
FIG._3a.
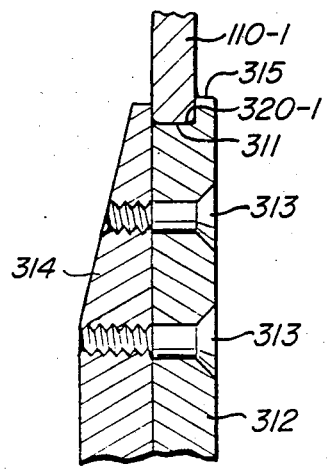
FIG._3c.
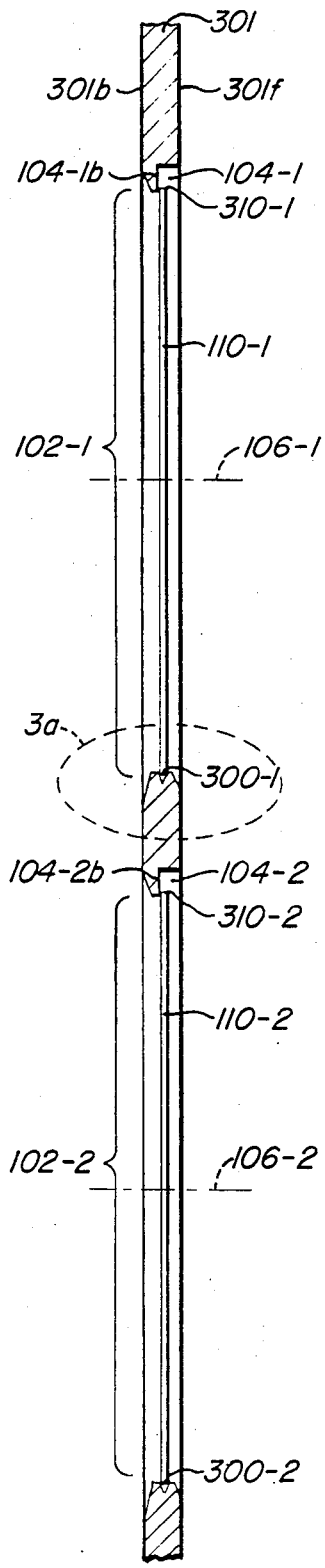
FIG._3b.

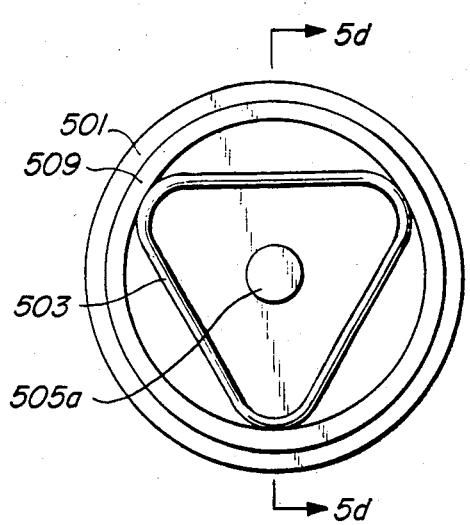
FIG._5a.
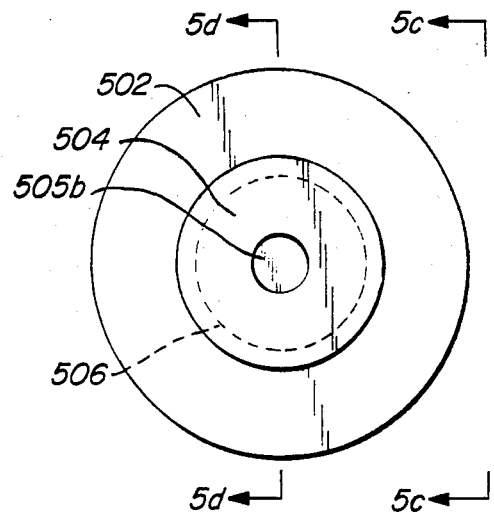
FIG._5b.
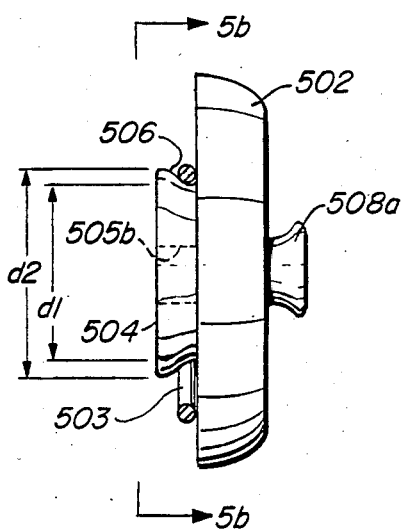
FIG._5c.
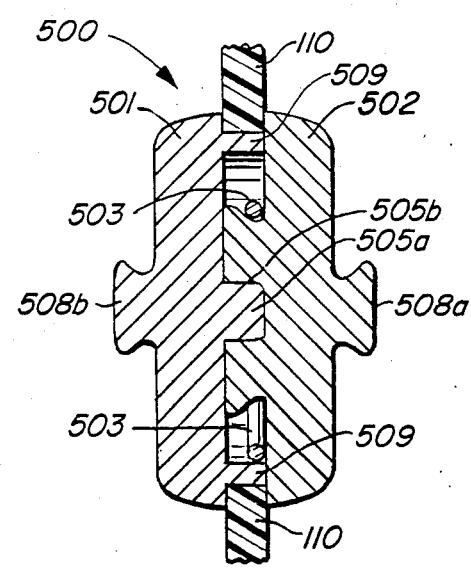
FIG._5d.

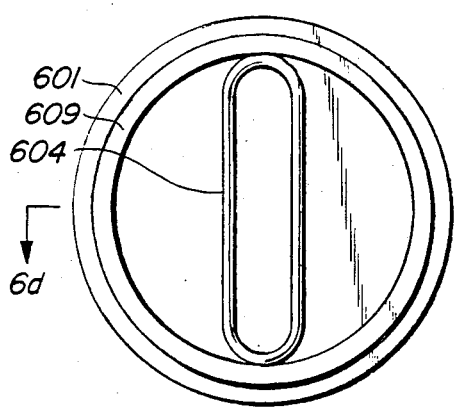
FIG._6a.
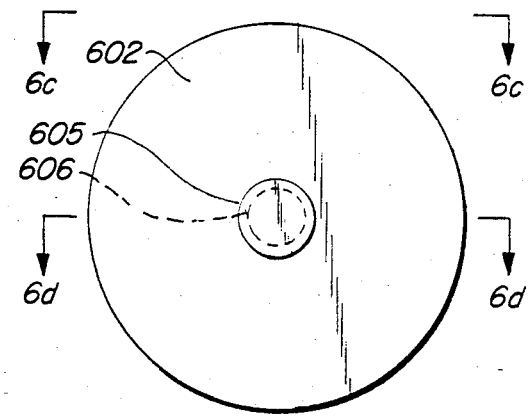
FIG._6b.
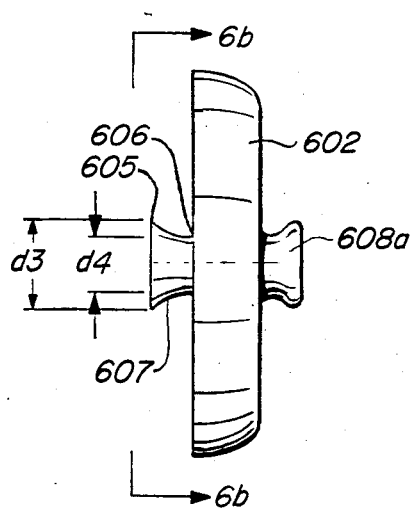
FIG._6c.
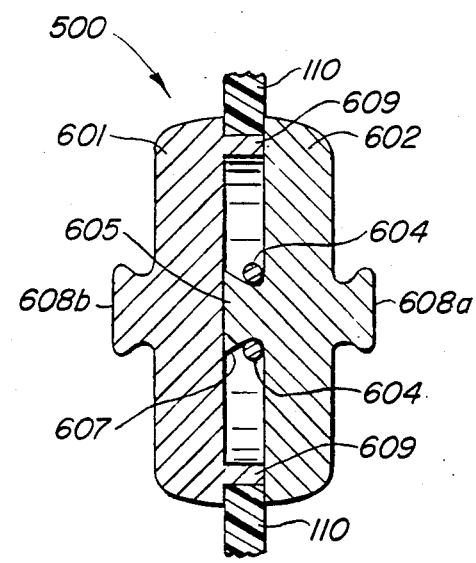
FIG._6d.

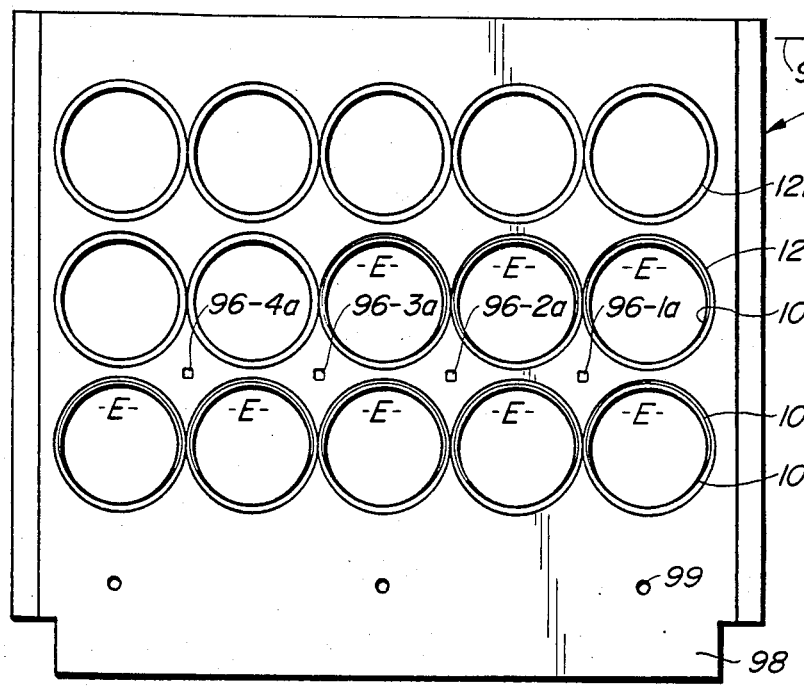
FIG._7a.
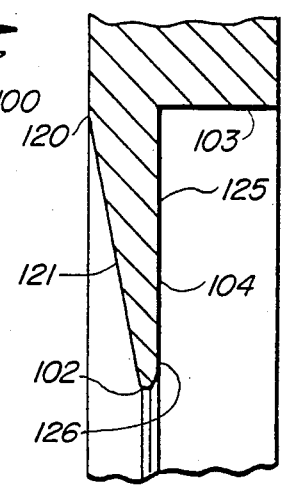
FIG._9a.
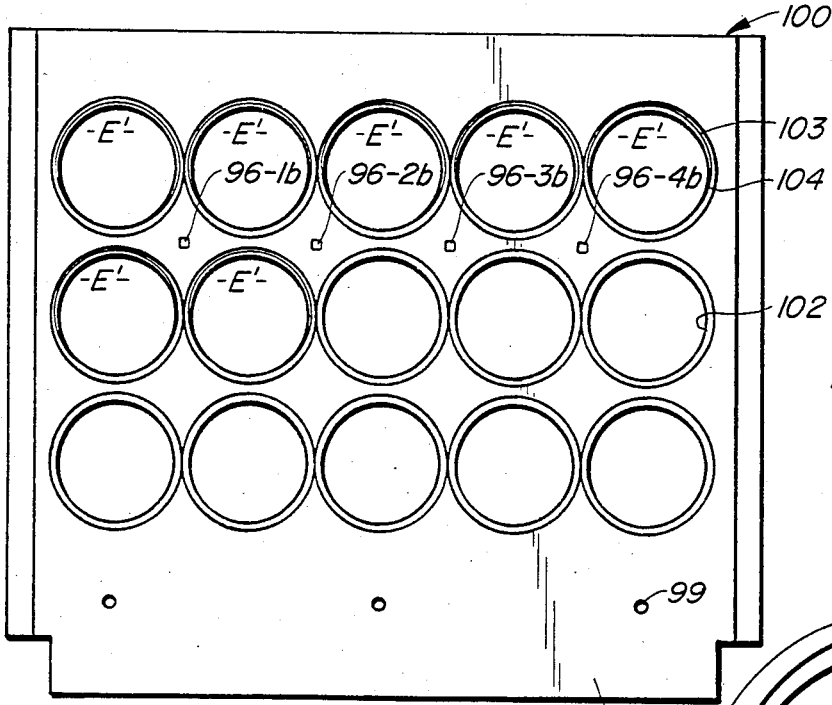
FIG._7b.
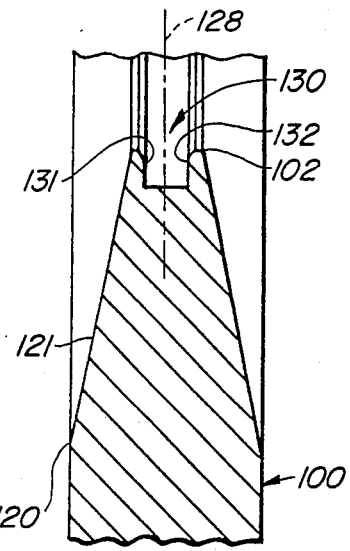
FIG._9b.
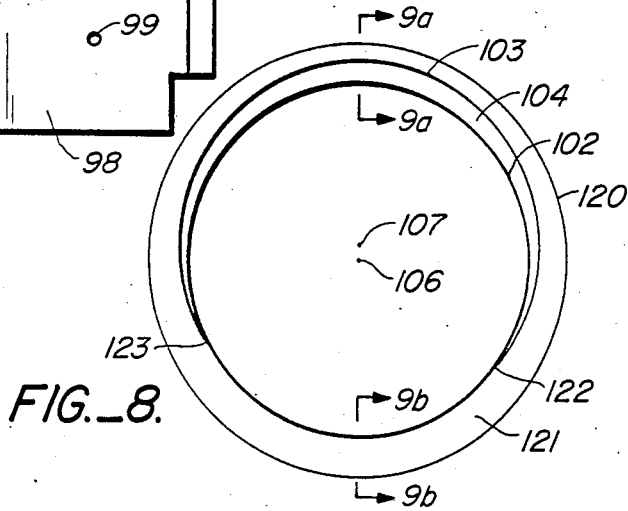
FIG._8.

DISK CARRIER

CROSS REFERENCE TO RELATED APPLICATIONS

This application is a continuation-in-part of U.S. application Ser. No. 642,853 filed Aug. 21, 1984 now U.S. Pat. No. 4,595,481.

It is also related to a continuation-in-part application based on Ser. No. 642,853 and entitled "DISK AND PLUG", filed as U.S. application Ser. No. 798,554, on Nov. 15, 1985, and an application entitled "ROBOTIC DISK HANDLER SYSTEM AND METHOD" filed as U.S. application Ser. No. 798,460, on Nov. 15, 1985, the disclosures of which are incorporated herein by reference. Each of such above applications include the same inventors and are assigned to the same assignee.

FIELD OF THE INVENTION

This invention relates to disks for use in disk drives and similar memory systems and in particular to a disk carrier for use in the manufacture of a disk which allows magnetic material to be coated simultaneously on the two surfaces of a disk without the passage of material from one side to the other side of the disk during the coating process.

BACKGROUND

The manufacture of memory disks for use in disk drives and similar systems is well known in the art. In the manufacture of such disks, an aluminum or other suitable blank is coated on both sides with magnetic media, for example, cobalt, nickel and chromium, in which information will be stored. Typically the coating is done by sputtering. To implement the sputtering process it is well known to use vertical electrodes on each side of the disk and thus coat both surfaces of the disk simultaneously. During the coating process two things can happen. First, one electrode can be cross-contaminated by sputtered material from the other electrode passing by the disk. This causes particles to form on the target (i.e. the electrode) which later flake off and then land on the disk thereby changing the composition of the magnetic media and forming impurities on the surface of the disk. Second, the plasma from one electrode can interfere with the plasma from the other electrode thereby preventing uniform depositing of magnetic media on each disk surface. To prevent these two things from happening in the formation simultaneously of magnetic media on both sides of the disk, one electrode must be completely screened from the other electrode.

In the coating of magnetic media on disk surfaces, a disk carrier is commonly used. The disk carrier must be designed so that it will not cause shadows on those portions of the disk surface on which magnetic media and other layers of material are being sputtered. Also, the carrier must be such that the disk can be easily loaded into the carrier by a human or a robot. In the prior art, the disk carriers have not been completely satisfactory in that the disk carrier typically has an opening between the top surface of the carrier and the disk which allows cross-contamination and plasma interference during the coating process.

SUMMARY OF THE INVENTION

In accordance with this invention, the above problem of the prior art is overcome by use of a disk carrier which allows the disk to be easily loaded into the carrier by a human or robot but which at the same time prevents cross-contamination, shadowing, and interference by portions of the plasma of one electrode coating one side of the disk with magnetic media or other materials with the plasma generated by the other electrode coating the other side of the disk with magnetic media or other materials.

In accordance with this invention, a disk holder or carrier plate is formed with at least one opening for receipt of a disk. The opening is specifically shaped so that the top circumference of a disk when placed in the opening is congruent with the top circumference of the opening in the disk carrier. A typical disk has a chamferred edge around its circumference. The bottom edge of the opening in the disk carrier is provided with a "V" groove or other channel or retainer so that the disk only rests on its chamferred edge. In accordance with this invention the "V" or "U" groove can be replaced with any other appropriately shaped channel or a pin structure such as three pins placed selected distances apart around the bottom portion of the opening to hold the chamferred edge of the disk. The material adjacent the top of the opening in the carrier is recessed a selected amount (typically one-half the thickness of the to-be-coated disk) beyond the center plane of the carrier plus a selected tolerance (in one embodiment +0.005 to 0.010") depending on the accuracy of the loading system) so that the disk can pass through the recessed portion during loading while no portion of the to-be-coated surface of the disk touches the carrier at any time. A portion of the carrier behind the recess extends down congruently to the edge of the disk when the disk is mounted in the opening. This recess in the carrier material adjacent the top of the disk both isolates one electrode from the other electrode and allows the disk to be loaded in the carrier without the to-be-coated disk surface touching the carrier.

The disk carrier of this invention is a one piece carrier with no moving parts. The elimination of moving parts eliminates the need to align the disk to the carrier and thus eliminates particle generation and reduces set-up time.

An embodiment of this invention includes having the recesses formed by the second openings at the top of the first openings be located, some on one side of the carrier and some on the opposite side of the carrier, so that the disks can be simultaneously loaded and later simultaneously unloaded from the carrier by two or more robotic arms working from opposite sides of the carrier. Thus, the time necessary for these loading and unloading operations may be halved or essentially halved where an equal number, or an essentially equal number, in the case of an odd number of openings, of disks are to be mounted in the carrier. This results in increased production of disks over a particular time period.

As part of this invention, a special plug is provided for placement in the opening in the center of a disk. The plug allows for thermal expansion of the disk during the sputtering process while holding the disk tight to prevent particle generation. During the sputtering operation, the plug cannot rattle on the disk or drop off when the disk expands. The plug further seals the disk aperture from cross-contamination of the plasmas directed on the opposite sides of each disk and is useful in handling the disk, including loading and unloading of the disk into the carrier plate.

This invention will be more fully understood in light of the following detailed descrption taken together with the drawings.

DESCRIPTION OF THE DRAWINGS

FIG. 1 shows an isometric view of a disk carrier of this invention for use in sputtering magnetic media simultaneously on both sides of a memory disk;

FIGS. 2a and 2b show the front and back views of the disk carrier of this invention wherein the recessed eccentric opening superimposed on the opening in the front of the disk carrier in which the disk is mounted is apparent from comparison of the front and back views of the carrier;

FIGS. 3a and 3b illustrate in cross-section a side view of a carrier containing at least two disks so as to show the V groove bottom edge of each opening for retention of the chamferred edge of each disk in the bottom surface of the corresponding opening in the carrier and also illustrate the recess of this invention at the top portion of each opening in the carrier;

FIG. 3c illustrates in cross-section a side view of an alternate pin structure for retention of the chamferred edge of a disk in the bottom surface of the opening in the carrier;

FIG. 4 illustrates in front view a plurality of openings formed in a larger carrier capable of holding a corresponding plurality of disks during the sputtering of magnetic media on the two surfaces of each of the disks;

FIGS. 5a through 5d show an interior plan view of one plug portion, an interior plan view of a second plug portion, a side view of the second plug portion and a cross-sectional view of an overall center plug, respectively, for placement in the center of each memory disk during the sputtering operation in accordance with this invention;

FIGS. 6a through 6d show corresponding views which illustrate a second embodiment of the center plug for placement in the center of each memory disk during the sputtering operation in accordance with this invention;

FIGS. 7a and 7b show front and back views of the carrier plate where various of the second openings forming the recesses are on opposite sides of the carrier;

FIG. 8 is a detailed view of the first and second openings in the carrier plate showing the second openings faired into the first openings; and FIGS. 9a and 9b are detailed cross-sectional side views of the top recess formed by the second opening and a U-shaped channel forming the lower disk edge-receiving wall of the first through-opening in the carrier plate, taken on lines 9a—9a and 9b—9b of FIG. 8, respectively.

DETAILED DESCRIPTION

While selected embodiments of this invention will be described below, other embodiments will be obvious in view of the following disclosure to those skilled in the art. Thus the following description is meant to be illustrative only and not limiting.

FIG. 1 illustrates an isometric schematic view of the carrier 100 of this invention with disc 110 mounted in opening 102 formed in carrier 100. Sputtering targets (i.e. electrodes) 131 and 132 are placed in a well-known manner on either side of disk 110 mounted in carrier 100. sputtering machines such as built by Varian or CPA, Inc. may be employed with the described carrier. The present invention is particularly useful in RF sputtering using a magnetron energy source. As shown in FIG. 1, carrier 100 comprises a block of material 101 in which is formed an opening 102. Opening 102 is circular with its center at center line 106. Disk 110 mounts congruently within circle 102. Around and above the top portion of opening 102 a portion of carrier material 101 is removed to form a recess 104, the outer circumference 103 of which is circular and has a center given by the intersection of center line 107 with the plane of disk 110. Recess 104 extends only part way through material 101 sufficient to allow disk 110 to rest vertically in carrier 100 without either the front or back face of disk 110, i.e. the annular areas to be coated, actually touching the material 101 of carrier 100.

As a feature of this invention, recess 104 is formed so that disk 110 can be mounted in block 101 by hand or by a robot without either to-be-coated surface of disk 110 touching block 101. Any time a surface to-be-coated of disk 110 touches block 101 small particles are generated or the surface is damaged. These particles may cause defects in the magnetic media being formed on both surfaces of disk 110 (FIG. 1). The disk carrier 100 of this invention substantially eliminates the generation of such particles or scratches, thereby substantially increasing the quality of disks capable of being fabricated. The depth and position of recess 104 is such that it allows the disk to be inserted in opening 102 without the surfaces to-be-coated touching the disk carrier.

FIGS. 2a and 2b illustrate the front and back views respectively of one embodiment of the disk carrier of this invention. As shown in FIG. 2a, the opening 102 in the carrier material 101 is formed with a radius R1 about center 106. An internal groove 108 (shown in dash lines in FIGS. 2a and 2b) is formed in the bottom 150° (75° to either side of the vertical radius to the bottom of portion 109b of opening 102) of the edge of opening 102. The length of the groove is not critical and indeed the groove must merely be of such a length as to hold a bottom edge periphery of the disk. A portion of the remainder of the circumference of opening 102 is occupied by recess 104. In the embodiment shown the recess 104 is formed for 105° on either side of the vertical radius R1 from center 106 to the top of the circumference of opening 102 to form a top arc 109a of approximately 210°. Recess 104 is formed with an outer circumference 103 generated by radius R2 rotating about center point 107. Center 107 is offset from center 106 in one embodiment suitable for use in fabricating 5¼" disks, by, for example, 0.1969 inches. The use of two off-center circles to form recess 104 simplifies the manufacture of the carrier of this invention.

For convenience in understanding the following descriptions, it is helpful to define the center plane of the carrier as the plane parallel to the two surfaces of the disk which is occupied by the center of the disk when the disk is mounted vertically in the carrier.

The recess 104 is formed by removing material within and over portion 109a of circumference 103 of carrier 100 from the front face of the carrier block 101 to a selected depth. Typically, this depth is such that the distance from the center plane of a disk placed in the carrier to the back wall of recess 104 is, equal to half the thickness of the to-be-coated disk, plus a 0.005" tolerance, so that the back to-be-coated surface of the disk does not touch the disk carrier upon insertion of the disk into or removal of the disk from the carrier. This depth is selected to ensure that the back wall of the recess 104 is aligned with the back surface of the to-be-coated disk within a selected tolerance.

The bottom portion 109b of opening 102 has formed therein in one embodiment a V groove 108 or 300 (FIG. 3a) with an angle of 60° and a depth of 0.060 inches (1.53 milimeters). The bottom vertex of the V groove is formed 0.060 inches from the external front surface 301f of carrier 100.

FIG. 3a illustrates in more detail the cross-section of one embodiment of the edge. In FIG. 3a, V groove 300 is formed in the edge of opening 102 to a depth of 0.060 inches. The center 301 of the V groove is 0.060 inches from front face 301f of carrier 100. The V groove has two surfaces 302a and 302b which form an angle of 60°, each surface forming an angle of 30° with the vertical. The front face 301f is chamferred at 10° from the vertical for a distance of 0.060 inches before the edge of the opening 102 is reached and the back face 301b is chamferred 10° from the vertical for a distance of about one-quarter inch before the edge of opening 102 is reached. Of course, other means for holding the bottom peripheral edge of the disk in place in the carrier can be used. Thus, as shown in FIG. 3c, two or more pins such as pin 312 (described below) can be attached to the front surface of the carrier to hold the bottom edge of the disk 110 in proper position in the carrier.

The relationship of carrier 100 to a disk 110 is shown in more detail in a side view in FIG. 3b. FIG. 3b illustrates in cross-section two openings formed in a carrier 301 capable of holding at least two disks 110-1 and 110-2. Disks 110-1 and 110-2 are shown mounted in the carrier with the chamferred edges 310-1 and 310-2 of each disk 110-1 and 110-2 respectively resting in the bottom V groove of the corresponding openings 102-1 and 102-2. The recesses 104-1 and 104-2 are clearly depicted in the cross-sectional view. Such recesses allow the disks 110-1 and 110-2 to be entered into the openings 102-1, 102-2 with the center of each disk 110-1 or 110-2 above its corresponding at-rest center line 106-1 or 106-2, respectively, and then lowered onto the bottom edge V grooves 300-1 or 300-2 of openings 102-1 or 102-2, as appropriate. The back side 104-1b of recess 104-1 and the back side 104-2b of recess 104-2 are each selected to be half the thickness of the disk plus a selected tolerance from the center plane of the corresponding disk 110-1 or 110-2, respectively. As defined above, the center plane of the disk is that plane occupied by all points on the disk equidistant from the two plane surfaces of the disk. The depths of the recesses 104-1 and 104-2 are measured from this center plane when the disks are mounted vertically in the carrier as shown in FIG. 3b.

An alternative to the "V" groove of FIG. 3a is a pin structure shown in FIG. 3c. Disk 110-1 is shown mounted with the chamferred edge 320-1 resting in the step-like recess 311 of a clamp 312. Clamp 312 is attached by screws 313, or some other fastening means to the carrier 314. The protruding rectangular portion 315 is flush against one side of disk 110-1, and the uppermost portion of carrier 314 is flush against the other side so as to hold disk 110 in place.

FIG. 4 illustrates a carrier with a plurality of six openings 102-1 through 102-6 formed in the carrier for receipt of a corresponding number of disks. Thus the carrier of FIG. 4 can be used in the sputtering simultaneously of magnetic material on both sides of six magnetic disks. Each opening 102-1 through 102-6 in carrier 100 is as described above in conjunction with FIGS. 1, 2a, 2b, 3a, and 3b.

In accordance with this invention the top edge of each opening 102 contains a portin 104 recessed an amount into the carrier 100 selected so that the surface to-be-coated of the disk 110 (FIG. 1), for example, does not touch the carrier 101. Such a carrier is particularly suitable for loading using robots because robots can stop within 100 microinches of a surface. This prevents particle generation which would interfere with the quality of the resulting coated disk.

The surface of the disk carrier adjacent the disk is beveled 10° or less from the plane of the surface to prevent shadowing by the edge of the opening in the carrier of the material being coated on the surfaces of the disk.

The recess 104 at the top of each opening 102 in the carrier serves two purposes. It provides isolation so that magnetic media can be coated simultaneously on both sides of the disks without cross-contamination and without interference. Secondly, it allows a disk to be loaded into the carrier without touching each to-be-coated disk surface to the carrier.

In the prior art, the opening in which a disk was mounted for coating was formed with a larger diameter than the disk. Unfortunately the annular open space between the edge of the disk and the opening in the carrier allowed plasma interference and cross-contamination. While it has been proposed to use a movable gate which can come down on top of the disk to close this annular open space after the disk has been loaded in the carrier, movement of one material relative to another generates particles which contaminate the magnetic media formed on the surface of the disk. This type of carrier is also harder and thus more expensive to make. Accordingly, the disk carrier of this invention comprises a one piece unitary carrier without moving parts which is easily loadable with the to-be-coated disk and which automatically self-aligns the disk in the carrier to prevent cross-contamination and plasma interference. The disk carrier of this invention is also cheaper to make than prior art disk carriers with movable parts. The use of a unitary carrier saves the need for any alignment of the disk to the carrier and thus reduces the cost of both the carrier and its use in a coating disk and avoids moving parts.

FIGS. 5a through 5d illustrate one embodiment of a center plug 500 for placement in the center of a disk to prevent plasma from flowing through the opening in the center of the disk from one side to the other of the disk. The plug not only blocks the opening in the disk but serves as a knob or handle by which the disk can be handled, carried and mounted in the carrier 100 (FIG. 1). As shown in FIG. 5a, portion 501 of the center plug 500 has formed in the interior of the plug a triangularly shaped spring means comprising spring wire section 503. Wire 503 is arranged in a triangular shape in the interior of circular, annular ridge 509 which serves both to hold wire 503 and to provide an outer stop for the inner diameter of disk 110. Cylindrical knob 505a protrudes outward from the center of the interior of portion 501 of plug 500 so that its cross-sectional planar end is coplanar wih the top of annular ridge 509. Wire 503 is configured such that center protrusion 504 on portion 502 of plug 500 as shown in FIG. 5b fits within the triangle formed by wire 503 in such a manner that wire 503 presses tangentially and hard against circumferential surface 506 of protrusion 504. Cylindrical hole 505b, extending through the center of protrusion 504, allows for the receipt of cylindrical knob 505a. As shown in FIG. 5c, the center protrusion 504 has a tapered circumferential surface 506 such that the diameter d1 of the protrusion 504 where the protrusion 504 joins base 502 is less than the diameter d2 of protrusion 504 at its end furthest from base 502. Accordingly wire 503 will tend to pull plug portion 502 toward plug portion 501. However, as the disk 110 (FIG. 5d) expands in thickness due to a change in its temperature during the sputtering process, the plug 500 also must expand to accomodate the disk 110. Thus portions 501 and 502 will be pushed apart but wire 503 will merely ride along surface 506 of plug 504 from the smaller toward the larger diameter. The plug 500 remains tightly located within the center hole of disk 110 thereby preventing particle generation while traveling to accommodate the thermal expansion of disk 110. Any particles generated by the movement of wire 503 against surface 506 are kept within the hole within disk 110 by the tight clamping of plug 500 against the two surfaces of disk 110 adjacent the hole in the disk. Thus the plug does not rattle on the disk or pop off the disk when the disk expands.

Knob-like protrusions 508a and 508b extending outward from the exterior sides of portions 502 and 501, respectively, as shown in FIG. 5d, allow the disk 110 clamped in the plug 500 to be handled by a person or a robot for placement in the carrier 100 or removal from the carrier.

FIGS. 6a through 6d illustrate a second embodiment of the center plug 500 for placement in the center of each memory disk during the sputtering operation in accordance with this invention. As shown in FIG. 6a, portion 601 of the center plug 500 has formed in the interior of the plug a circular annular ridge 609. Ridge 609 serves both to hold spring wire means 604 and to provide an outer stop for the inner diameter of disk 110. Spring wire means 604 is placed within annular ridge 609 forming an elongated oval along a cross-sectional diameter of the portion 601. Wire 604 is further configured such that center protrusion 605 on portion 602 of plug 500 as shown in FIG. 6b fits within the oval formed by wire 604 in such a manner that wire 604 presses tangentially and hard against circumferential surface 607 of protrusion 605. As shown in FIG. 6c, the center protrusion 605 has a tapered circumferential surface 607 such that the diameter d4 of the protrusion 605 where the protrusion 605 joins base 606 is less than the diameter d3 of protrusion 605 at its end furthest from base 606. Accordingly, wire 604 will tend to pull plug portion 602 toward plug portion 601. Knob-like protrusions 608a and 608b (FIG. 6d) as extending outward from the exterior sides of portions 602 and 601, respectively, allow the disk clamped in the plug to be handled by a person or robot for placement in or removal from carrier 100.

As seen in the related application entitled "DISK AND PLUG", the center plug may be formed with one portion including a permanent magnet and the other portion a magnetic pole piece so that magnetic attraction will hold the portions together. This results in a more reproducible force and stroke for connecting and disconnecting the portions from the disk aperture than is possible with the above-described spring devices which are subject to wear and possible jamming.

In practice a number of disks are placed simultaneously in a carrier containing a plurality of openings as shown in FIG. 4 thereby allowing the magnetic media to be sputtered simultaneously on all surfaces of the disks in the carrier.

As seen in FIGS. 7a and 7b, the recesses 104 may be provided on various sides of a carrier plate. FIG. 7a shows one side of a carrier plate 100 with three rows each of five openings extending across the plate 100. Eight of the fifteen openings 102 have their recesses 104 (formed by openings 103 extending part way into the plate) on that one side. As shown by the letter E indicating the disk entrance side, the first three first openings 102 of the middle row and all of the first openings 102 of the lower row are entered by an inserted disk through a recess 104 on that one side. In FIG. 7b, the reverse side of the carrier plate is shown with all the first openings 102 marked by the letter E' of the top row and the first two openings 102 of the middle row formed with recesses 104 on that reverse or opposite side of the carrier plate. Carrier plate 100 has a lower clamp portion 98 which is clamped through suitable multiple bolt holes 99 or the like to a wheel set (not shown) which passes the carrier plate laterally past the appropriate sputtering electrode targets 131 and 132 (FIG. 1) aligned with the moving carrier plate. The wheel set is movable in a rail groove (not shown). Arrow 97 in FIG. 7a shows this lateral motion. Two sets of square indexing depressions 96-1a through 96-4a and 96-1b through 96-4b may be provided between the openings 102 and utilized to locate robot arms for loading and unloading disks on the first side and on the opposite side of the carrier plate. Each robot arm is provided with fingers which grasp the knobs on the disk plug and which are used to move a disk from one position to another, to insert and remove the central disk plug and to load and unload the disk and plug from the carrier plate.

FIG. 8 illustrates a modified overall form of first and second apertures in which the second circular opening 103 is formed on a center line 107 offset from the center line 106 forming the circular opening 102. Circular beveled surface 121 extends on the carrier plate from circular locus 120 to opening 102. The recess 104, more particularly the opening 103, is faired into the opening 102 at points 122 and 123 so that the recess 104 subtends an arc of about 208° and the bottom disk-receiving groove (previously described but not shown in FIG. 8) subtends an arc of about 152°.

FIG. 9a is a magnified view of a recess 104 formed by second opening 103 and extending partially inward from a side of the carrier plate. The radial length of surface 125 at its vertical top at 9a—9a (FIG. 8) is about 15 mm.

FIG. 9b illustrates the bottom of opening 102 in which a U-shaped groove 130 having vertical side walls 131 and 132 and a bottom wall forms an overall bottom peripheral disk-holding groove disposed symmetrically on about the central plane 128 of the carrier plate 100. In a typical panel, the depth of groove 130 is normally 1 mm and the opening 102 is 128 mm. Therefore, when a standard 130 mm hard disk is inserted into recess 104 and opening 102, the lower edge of the disk sits in groove 130 and the upper 1 mm edge of the disk periphery rests on about 1 mm inner radial portion 126 of surface 125 of the recess 104 (FIG. 9a). This results in about a 1 mm of the entire peripheral edge of the disk, when loaded into opening 102, being in contact with a side wall groove 131 or 132 or a radial portion 126 of surface 125 so that there is no open annulus between the disk periphery and the opening 102, which if present would permit cross-communication of plasma from one side of the carrier plate to the other, i.e. there is no gap between the disk and opening 102 when the lower part of the disk periphery is in the groove 130 and when the remainder of the disk periphery abuts the surface 126 of the recess 104. After coating, the disk contains about a 3 mm radial outer edge peripheral portion which is not designed for accessing read-write magnetic material which may be coated thereon.

While several embodiments of the above invention have been described, other embodiments of this invention will be obvious in view of this disclosure. In particular, other embodiments of the plug using other configurations for the spring 503 and the protrusion 504 will be obvious in view of this disclosure.

We claim:

1. A carrier for mounting a circular two-sided disk of fixed diameter and having an annular planar surface on each of the two disk sides to be coated with magnetic material, said planar surfaces extending from inward of a peripheral edge of said disk to a central aperture in said disk, said carrier comprising:
    a carrier plate;
    a first circular opening extending through said carrier plate, said first circular opening having a diameter slightly less than the diameter of said disk and being bounded in part by a wall positioned to support a disk peripheral edge; and
    a second circular segment opening in said carrier plate having its center of revolution offset from said first circular opening, extending partly through said carrier plate and extending partially around said first circular opening such that a recess is formed in such carrier plate partially around said first circular opening, said recess being sized to receive peripheral edge portions of said disk permitting coating of said planar surface on both sides of said disk and wherein said disk when mounted in said carrier plate abuts said wall of said first circular opening and said recess.

2. The carrier set forth in claim 1 further comprising a plurality of said first and said second openings in said carrier plate to allow both said annular planar surfaces of each of a plurality of disks to be held within said first openings while said planar surfaces are being coated with magnetic material on each disk side.

3. The carrier as set forth in claim 2 in which some of said plurality of second openings extend partly within said carrier plate from a first side of said carrier plate and the remainder of said plurality of second openings extend partly within said carrier plate from a second side of said carrier plate opposite said first side of said carrier plate, whereby some of said plurality of disks may be inserted and removed from one side of said carrier plate and the remainder of said plurality of disks may be inserted and removed from the opposite side of said carrier plate.

4. The carrier as set forth in claim 3 in which essentially one-half of said second openings extend partly into said carrier plate on the first side of said carrier plate and essentially one-half of said second openings extend partly into said carrier plate on said second side of said carrier plate.

5. The carrier set forth in claim 1 wherein said carrier plate contains multiple first and second openings for holding a corresponding multiple number of disks to be coated with magnetic material.

6. The carrier as set forth in claim 5 wherein said carrier plate is rectangular.

7. The carrier as set forth in claim 1 wherein said recess is sized to have a back side of about half the thickness of a disk to be mounted in said recess such that the planar surface on the side of a mounted disk opposite said recess does not touch said carrier plate.

8. A carrier for mounting a circular two-sided disk of fixed diameter and having an annular planar surface on each of the two disk sides to be coated with magnetic material, said planar surfaces extending from inward of a peripheral edge of said disk to a central aperture in said disk, said carrier comprising:
    a carrier plate;
    a first circular opening extending through said carrier plate, said first circular opening having a diameter slightly less than the diameter of said disk and being bounded in part by a wall positioned to support a disk peripheral edge; and
    a second opening in said carrier plate offset from said first circular opening, extending partly through said carrier plate and extending partially around said first circular opening such that a recess is formed in such carrier plate partially around said first circular opening, said recess being sized to receive peripheral edge portions of said disk and wherein said disk when mounted in said carrier plate abuts said wall of said first circular opening and said recess, further comprising a plug closure for said disk central aperture, said plug closure comprising first and second plug portions assembled on peripheral edges of opposite sides of said disk central aperture radially inward from said annular planar surfaces on said disk and including means for temporarily holding said plug portions in position in the central aperture of said disk thereby to seal said central aperture and prevent material from passing through said central aperture during the coating of said two disk sides.

9. A carrier for mounting a circular two-sided disk of fixed diameter and having an annular planar surface on each of the two disk sides to be coated with magnetic material, said planar surfaces extending from inward of a peripheral edge of said disk to a central aperture in said disk, said carrier comprising:
    a carrier plate;
    a first circular opening extending through said carrier plate, said first circular opening having a diameter slightly less than the diameter of said disk and being bounded in part by a wall positioned to support a disk peripheral edge; and
    a second opening in said carrier plate offset from said first circular opening, extending partly through said carrier plate and extending partially around said first circular opening such that a recess is formed in such carrier plate partialy around said first circular opening, said recess being sized to receive peripheral edge portions of said disk and wherein said disk when mounted in said carrier plate abuts said wall of said first circular opening and said recess and in which said wall partly bounding said first circular opening comprises a groove extending into the carrier plate over an arc of said first circular opening.

10. The carrier set forth in claim 9 in which said groove is V-shaped.

11. The carrier set forth in claim 9 in which said groove is U-shaped.

12. The carrier as set forth in claim 11 in which said U-shaped groove is positioned at a bottom arc of said first circular opening as said carrier plate is oriented vertically and extends symmetrically about a central plane of said carrier plate.

* * * * *

UNITED STATES PATENT AND TRADEMARK OFFICE
CERTIFICATE OF CORRECTION

PATENT NO. : 4,735,701
DATED : April 5, 1988
INVENTOR(S) : Tu Chen et al.

It is certified that error appears in the above-identified patent and that said Letters Patent is hereby corrected as shown below:

Col. 3, line 13, after "and" insert --the--.

Col. 6, line 4, "portin" should read --portion--.

Col. 7, line 11, "accomodate" should read --accommodate--.
Col. 8, line 61, after "on" insert --an--.
Col. 10, line 51, "partialy" should read --partially--.

Signed and Sealed this

Tenth Day of January, 1989

Attest:

DONALD J. QUIGG

*Attesting Officer*  *Commissioner of Patents and Trademarks*